March 8, 1966  D. M. POTTER  3,238,776
TURBINE FLOWMETER
Filed Nov. 23, 1960
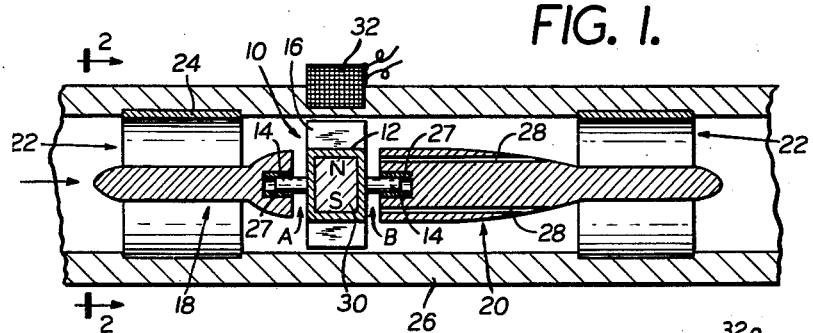
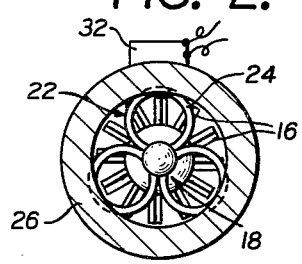
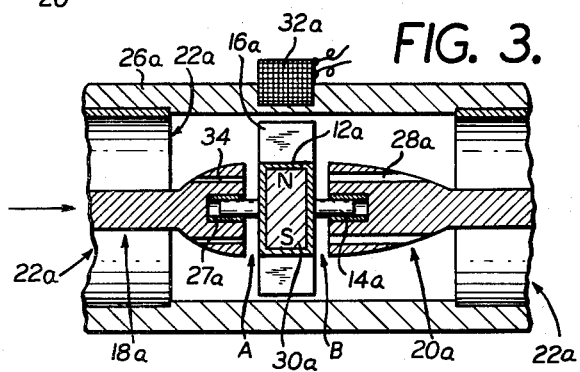
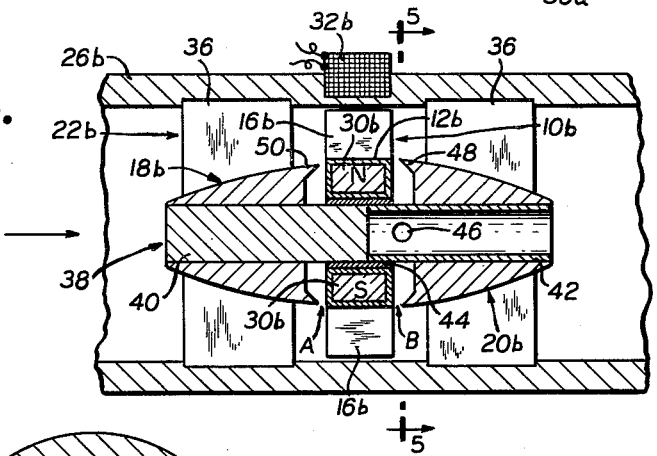
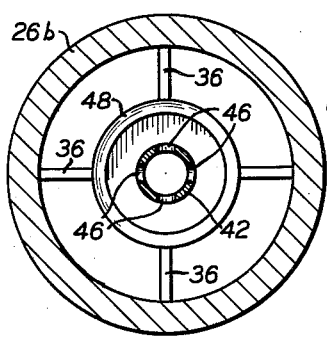
INVENTOR
DAVID M. POTTER
BY
ATTORNEYS.

United States Patent Office 3,238,776
Patented Mar. 8, 1966

3,238,776
TURBINE FLOWMETER
David Magie Potter, Liberty Corners Road, Far Hills, N.J.
Filed Nov. 23, 1960, Ser. No. 71,273
10 Claims. (Cl. 73—231)

This invention relates to fluid metering sensors, gas or liquid, and more particularly to fluid flow sensors of the turbine type. The invention is in the nature of an improvement upon the type of flowmeter disclosed and claimed in Potter Patent No. 2,709,755 of May 31, 1955.

In the patent referred to, a vaned rotor of considerable length and mass is supported in upstream and downstream rotor mounts with freedom to shift freely upstream and downstream through a significantly extensive range relative to the rotor mounts. The upstream rotor mount is constructed as a shield which covers all but a narrow, annular, marginal portion of the upstream end of the rotor body, and the rotor body is tapered to a greatly reduced diameter at its rear or downstream end.

With an organization of the kind referred to, the limited downstream thrust applied to the rotor by the flowing stream is balanced by an upstream thrust applied by the fluid to the contracting downstream surface of the rotor, the result being that end thrust of the rotor against the rotor mounts and the creation of end thrust friction are completely avoided. This construction has worked out well in practice, and up to the present time it has been regarded as the best possible solution of the problem of providing a sensitive rotor, free from end thrust friction, whose rate of rotation is substantially a linear function of the rate of fluid flow throughout a very substantial portion of its operating range.

The arrangement outlined above does, however, have drawbacks which it is the purpose of the present invention to overcome or ameliorate. Chief among the drawbacks are the following:

(1) The substantial mass of the rotor, due to its length, makes the rotor slow to respond in speed to changes of fluid velocity, and insensitive to very slow rates of fluid flow;

(2) The extensive peripheral area of the rotor introduces undesirably large frictional resistance to rotation, particularly if the liquid is viscous, and this interferes with linearity of the relation of rate of rotation to rate of fluid flow;

(3) In the manufacture of the device the balancing of the rotor about the rotor axis throughout the length of the rotor is an operation of some difficulty, particularly because the rotor is so long. Any imbalance tends to produce a rhythmic fluctuation or pulsation of the rotary velocity, and an imbalance located toward one end or the other of the rotor tends to produce wobble. Securement of acceptable balance in the long rotor is tedious and hence adds materially to the labor cost which goes into the instrument; and (4) Longevity and dependability have been impaired by rapid bearing wear, due in considerable measure to the mass of the rotor and imperfection of balance.

In accordance with the present invention, the length, mass and superficial area of the rotor are greatly reduced, the rotor being substantially cylindrical in form and not substantially longer than the axial extent of the rotor blades. The new rotor characteristics go a long way toward obviating the objectionable features of the prior art rotors referred to above. Linearity is improved, sensitivity is increased, the useful range is extended, pressure drop produced by the rotor is diminished and a substantial labor saving is realized. The reduction of length and the substantial elimination of taper of the rotor body, however, eliminate the capacity of the rotor to push upstream and thereby to avoid thrust friction.

It is a primary object of the invention to provide an upstream thrust against the rotor by new means and through a new principle, so that the elimination of end thrust friction may still be realized in an instrument employing the new rotor.

To this end it is a feature of the invention that the downstream rotor mount is formed with an elongated, tapered body having one or more longitudinal passages formed in it through which a portion of the flowing fluid can be conducted upstream to impinge against the downstream face of the rotor. The liquid thus returned upstream is caused to flow outward through the space between the rotor and the downstream rotor mount and to rejoin the main stream. This recirculated liquid maintains a narrow space of variable width between the rotor and the downstream rotor mount, and prevents the rotor from physically contacting the downstream rotor mount.

The reason why a recirculatory flow of liquid occurs through the downstream rotor mount can be made readily apparent. In any flowing stream the region of least cross sectional flow area is the region of highest velocity and of the lowest lateral pressure and, conversely, the region of greatest cross sectional flow area is the region of least flow velocity and of greatest lateral pressure. It follows that the region surrounding the space between the rotor and the downstream rotor mount is a region of low pressure while the region along the sloping surface of the downstream rotor mount is a region of greater, and progressively increasing, pressure. The flowing fluid will therefore be forced upstream through the downstream rotor mount into the space between the rotor and said downstream rotor mount, and thence outward into the surrounding low pressure region.

It has been found that the upstream thrust on the rotor which may be secured in this way can be caused to counterbalance the downstream thrust forces, provided that the upstream rotor mount is designed to shield the rotor against the downstream fluid thrust to a sufficient extent.

Other objects and advantages will hereinafter appear.

In the drawing forming part of this specification,

FIG. 1 is a view in longitudinal section of an installed flow sensor which embodies features of the present invention;

FIG. 2 is a transverse sectional view taken on the line 2—2 of FIG. 1 looking in the direction of the arrows;

FIG. 3 is a view similar to FIG. 1 showing a modified form of sensor;

FIG. 4 is a further view similar to FIG. 1 showing another modified form of sensor; and FIG. 5 is a sectional view taken on the line 5—5 of FIG. 4, looking in the direction of the arrows.

FIGS. 1 and 2 disclose a practical and advantageous illustrative, flowmeter sensor which embodies features of the invention. A rotor 10 comprises a cylindrical body 12, axially aligned rotary bearing members or trunnions 14, and vanes 16. Axially aligned upstream and downstream rotor mounts 18 and 20 are supported in conventional spiders or hangers 22 which are composed of hollow cylindrical members 24. The cylindrical members 24 are anchored in shouldered recesses which are formed within a conduit segment 26. Each rotor mount is equipped with a bearing 27 in which one of the rotary bearing members 14 of the rotor 10 is rotatably supported. The rotor 10 is mounted with capacity for significantly extensive, free axial movement, so that it may shift upstream and downstream to find a position of balance in which the upstream and downstream fluid forces acting upon it are equal.

As shown in FIG. 1, the upstream rotor mount 18 has a fairly long, streamlined body portion. At its end adjacent the rotor the mount 18 has a substantially flat face which confronts, and is spaced from, a substantially flat upstream face of the rotor 10. At its lower end, the mount 18 has substantially the same diameter as the rotor body 12, but as it recedes from the rotor, it contracts symmetrically in cross sectional area. The rotor mount 18 is moderately elongated, but it is not nearly as long as the downstream rotor mount 20. The rotor mount 20 in this embodiment also has a substantially flat face which confronts a substantially flat downstream face of the rotor body 12, and this mount also contracts as it recedes from the rotor, though at a less pronounced rate than that a which the rotor mount 18 contracts. The two rotor mounts 18 and 20, together with the rotor body 12, constitute a composite streamlined structure which is adapted to pass the fluid with a minimum of disturbance, a relatively blunt end of the structure being disposed upstream.

The downstream rotor mount 20 is bored through, there being illustratively a plurality of equally spaced, axially extending bores 28. The bores 28 start at their downstream ends in a conduit zone of substantially increased flow area as compared with the flow area available at, and immediately adjacent to, the rotor. The bores, therefore, transmit fluid upstream and deliver it into the space B between the upstream face of the rotor mount 20 and the downstream face of the rotor body 12 at a pressure substantially higher than the pressure of the surrounding fluid which flows at comparatively high velocity past such space. It follows that the recirculated fluid passes out through the space between the rotor body and the downstream rotor bearing to rejoin the main stream.

In the illustrative form of the invention now being described, an upstream rotor mount 18 is circumferentially coterminous at its lower end with the rotor body 12 and shields the entire upstream face thereof against direct impingement of the flowing fluid against it. There are, nevertheless, important downstream thrust forces to be offset if the objective of eliminating downstream bearing thrust and thrust friction is to be realized. These forces include:

(1) The axial component of forces exerted by the stream upon the rotor blades, this component being dependent upon the angular position of the vanes relative to the conduit axis and upon the stream velocity;

(2) The downstream frictional drag of the flowing stream across the peripheral surface of the rotor body;

(3) The downstream thrust resulting from the fluid pressure which is maintained in the space A between the rotor body 12 and the upstream rotor mount 18. This last pressure will always be less per unit area than that maintained in the space between the rotor body 12 and the downstream rotor mount 20; and (4) The impingement of fluid on the upstream edges of the rotor vanes 16 and any exposed upstream margin of the rotor body 12.

The pressure maintained in the space B between the rotor body 12 and the downstream rotor mount 20 will be a compromise between two pressures, namely, the comparatively low pressure of the flowing liquid in the region surrounding that space, and the greater pressure at the downstream end of the bores 28. The pressure in the space B will depend in part upon the relative freedom of communication of the space B with the regions in which the two pressures referred to are maintained.

The freedom of communication of the space with the downstream ends of the bores 28 will be determined and fixed by the number and size of the bores, but the freedom of communication with the region of the conduit which surrounds the space B will increase as the rotor moves upstream to widen the space, and will diminish as the rotor moves downstream to narrow the space. It will be evident, therefore, that the pressure in the space B, and hence the resistance to downstream movement of the rotor 10, will increase as the rotor moves downstream and will diminish as the rotor moves upstream.

With the rotor body 12 completely shielded against direct liquid impingement by the upstream rotor mount 18, the bores 28 are required to be restricted in number and in diameter and a comparatively wide range of axial movement of the rotor is desirable. If the upstream rotor mount 18 were reduced in diameter at its expanded end to leave a marginal annulus of the rotor body 12 unshielded, the bores 28 would have to be increased in-diameter and/or number, and a lesser range of axial movement of the rotor 10 will suffice.

The position at which the upstream forces balance the sum of the four downstream forces enumerated above will depend upon the velocity of the stream, but for every velocity there will be a position of balance in which the rotor is spaced substantially away from both of the rotor mounts 18 and 20.

The rotor body 12 carries within it a permanent bar magnet 30 which through the blades 16, or such portion of them as may be of permeable material, induces in a pickup coil 32 signal impulses which may either be counted for securing an indication of the flow rate of the stream, or be utilized for securing a direct current voltage proportional to the rate of rotation of the rotor, and hence to the rate of flow of the stream. Since both methods of utilizing the impulses are well-known commercially and neither forms a part of the present invention, the mechanism for securing these results is not shown and will not be described.

In the embodiment of the invention disclosed in FIGS. 1 and 2 the pressure maintained in the space A corresponds substantially with the lateral pressure of the fluid flow in the region which surrounds that space, regardless of variation in the width of the space. In FIG. 3 disclosure is made of an organization in which the pressure in the space A is increased as the space A is narrowed, and diminishes as the space A is widened. In this way, a progressively increased resistance to the upstream movement of the rotor automatically results as the space A is narrowed, the arrangement corresponding to that through which a progressively increased resistance to the downstream movement of the rotor automatically results as the space B is narrowed.

The embodiment of FIG. 3 is generally like that of FIG. 1. Corresponding reference characters have accordingly been applied in FIG. 3 to corresponding parts with the subscript $a$ added in each instance, and the description will be confined to the features of difference.

The expanded or enlarged portion of the rotor mount 18a has a series of small bores 34 extending axially through it. In this instance the pressure in the space A will be a compromise between the pressure maintained in the flowing stream in the region which surrounds the space A, and the higher pressure which exists in the region at the upstream or intake ends of the bores 34, and will depend upon the relative freedom of communication between the space A and the respective regions. Since the freedom of communication between the space A and the upstream ends of the bores 34 is fixed, and the freedom of communication between the space A and the surrounding region will be curtailed by upstream movement of the rotor 10a, the pressure in the space A will increase as the space A is narrowed.

The provision of the bores 34 through the upstream rotor mount 18a increases the sum of the downstream thrust forces against the rotor 10a and, therefore, requires an increased counterbalancing upstream thrust. For this reason the bores 28a are made larger and/or more numerous than the bores 28 of FIG. 1 for increasing the freedom of communication of the space B with the conduit region at the downstream ends of the bores 28a. In other words, the bores 34 are always of less flow capacity in the aggregate than the bores 28a.

As the rotor 10a moves upstream away from the rotor mount 20a and toward the rotor mount 18a the pressure in the space B becomes less and less and the pressure in the space A becomes greater and greater, while conversely, as the rotor 10a moves downstream away from the rotor mount 18a and toward the rotor mount 20a, the pressure in the space A becomes less and less and the pressure in the space B becomes greater and greater. When the pressures in the spaces A and B vary inversely with axial movement of the rotor, as in FIG. 3, the securement of a design in which the rotor will be strongly and dependably restrained against movement into engagement with, or objectionable proximity to, either the downstream rotor mount 20a or the upstream rotor mount 18a is facilitated.

In FIGURE 4 disclosure is made of a further embodiment in which the upstream and downstream forces acting axially on the rotor are caused to vary inversely as the rotor shifts upstream and downstream, and in which the opposing thrusts are considerably increased in magnitude as compared with the two embodiments described above.

The embodiment of FIG. 4 is generally like the embodiments of FIGS. 1, 2 and 3. Corresponding reference characters have accordingly been applied to corresponding parts in FIG. 4 with the subscript b added in each instance, and the description will be confined to the features of difference.

In FIG. 4 upstream and downstream rotor mounts 18b and 20b are supported in fixed positions in the conduit 26b by means of spiders or hangers 22b, but in this instance the tapering portions of the mounts are desirably directly engaged and supported by the hangers and for that reason the hangers are made to consist of evenly spaced, radially extending blades 36. The rotor mounts are connected to, and jointly support, a composite shaft 38 which comprises a solid section 40 and a hollow section 42. The solid section 40 extends through the upstream rotor mount 18b while the section 42 extends through a bore provided in the downstream rotor mount 20b. At the junction of the sections 40 and 42, the sections are surrounded by a fixed bearing sleeve 44, to which they are both attached. The rotor 10b is mounted on the bearing sleeve 44 with freedom for axial movement relative to the bearing sleeve.

The hollow shaft section 42 includes a plurality of equally spaced wall openings 46 (one shown) in line with the space B. The hollow shaft section 42 places the space B in very free communication with a conduit zone whose flow area is the full cross sectional area of the conduit. The pressure at the downstream or intake end of the hollow shaft section 42 is, therefore, high, and this high pressure is freely communicated to the space B. Communication of the space B with the region of the conduit which surrounds the space B is restricted by a tapering marginal flange 48 which is formed on the rotor mount 20b, and which projects forward toward the rotor body 12b.

The fact that the flange 48 is provided has several advantages:

(1) It enables fairly large openings 46 to be wide open at all times, even when the width of the exit space between the flange 48 and the rotor body 12b is considerably less than the diameters of the openings;

(2) It provides an increased flow area through the major part of the space B, thus preventing radial fluid velocities of large magnitude from developing in that space at high rotor velocities and so avoiding any large reduction of the upstream pressure of the fluid against the rotor body 12b;

(3) It provides a residual body of fluid within the confines of the flange, a fact which is especially advantageous when the fluid involved is a gas, because it tends to prevent sudden or spasmodic movements of the motor 10b in response to sudden or momentary fluctuations of flow conditions;

(4) It deflects the outflowing liquid toward the rotor body and through a comparatively narrow exit passage, and thereby brings into play an impact force of the fluid against the rotor body directly opposite the flange, which force increases markedly as the exit passage is narrowed;

(5) It reduces viscous drag between the rotor and the rotor mount by maintaining a substantial thickness of fluid between them; and (6) By restricting communication of the space B with the low pressure region which surrounds the rotor, it interferes with evacuation of the space B at high rotor velocities, a feature of special importance in gas applications.

The upstream rotor mount 18b has a maximum diameter substantially less than the diameter of the rotor body, so that a substantial marginal area of the rotor body is subjected to the full, direct impact of the flowing stream when the rotor is at or near its upstream limit of movement. As the rotor shifts downstream, away from the rotor mount 18b, the fluid because it is deflected outward by the rotor mount, strikes squarely against a progressively diminishing marginal area of the rotor body and, therefore, exerts a diminishing velocity head effect upon the rotor body. It is evident, therefore, that the downstream thrust against the rotor body 12b increases progressively as the rotor shifts upstream and diminishes progressively as the rotor shifts downstream, whereas the upstream thrust against the rotor body increases progressively as the rotor shifts downstream and diminishes as the rotor shifts upstream.

The upstream rotor mount 18b is formed with a tapering marginal flange 50 which is similar to the flange 48. This flange increases the volume of the fluid maintained in the space A. This feature is of particular advantage when the fluid involved is a gas for the reason pointed out in connection with the flange 48.

While certain preferred embodiments of the invention have been illustrated and described in detail, it is to be understood that changes may be made therein and the invention embodied in other structures. It is not, therefore, the intention to limit the patent to the specific construction illustrated, but to cover the invention broadly in whatever form its principles may be utilized.

I claim:

1. A fluid flowmeter comprising in combination, a conduit segment,
   a turbine rotor mounted therein substantially coaxially with said conduit segment and comprising a vaned, substantially cylindrical body,
   a stationary mount therefor held by said segment, said mount having
   an upstream and downstream portion, each of which has a face confronting said rotor, said portions being separated by a distance significantly greater than the width of the rotor,
   and said portions contracting symmetrically in cross section as each recedes from the rotor; at least one of said portions including
   bearing means for the rotor affording a significantly extensive free axial movement of the rotor between said faces,
   the downstream of said portions of said mount having a longitudinal passageway between its said face and a point on the periphery of said portion where said portion is substantially reduced in diameter so as to provide at such point an increased cross section of the flow stream and a decreased velocity and greater pressure head of said stream which is sufficient to cause a reverse flow of fluid through said passageway into the free space between the rotor and the said downstream confronting face, such reverse flow stream exerting a counterthrust upon the rotor body whereby said rotor is caused to be responsive to the difference between such counterthrust and the opposing downstream thrust as modified by said upstream mount portion and hence occupies an axial position of equilibrium between said confronting faces in which there is no end thrust between the rotor and the rotor mount portions.

2. The flowmeter according to claim 1 in which said upstream portion of the mount also has at least one longitudinal passageway to provide a direct flow of fluid into the space between the upstream face of the rotor and the confronting downstream face of the mount.

3. The flowmeter according to claim 1 in which essentially all of the return flow of fluid to the space between the downstream face of the rotor body and the confronting face of the downstream portion of the rotor mount is provided for by a plurality of substantially evenly spaced passages spaced substantially inwardly from the periphery of the rotor body.

4. A flowmeter as set forth in claim 1 in which the upstream portion of the rotor mount is much shorter than the said downstream portion, and in which the maximum diameters of the said portions are substantially equal to the diameter of the rotor body, and the rotor and rotor mount form a composite streamlined structure having its comparatively blunt end faced upstream.

5. The flowmeter according to claim 1 in which essentially all of the return flow of fluid to the space between the downstream face of the rotor body and the confronting face of the downstream portion of the rotor mount is provided for by a passageway disposed centrally of said downstream portion having communication with said space.

6. A flowmeter as set forth in claim 1 in which the expanded end of the upstream portion of the rotor mount has a maximum diameter adjacent the rotor which is somewhat less than the diameter of the rotor, so that the outwardly deflected, flowing fluid impinges more and more directly and forcefully upon the exposed margin of the upstream face of the rotor as the rotor moves nearer to the upstream portion of the rotor mount, and the relation of the rotor to the downstream portion of the rotor mount is such that the recirculating fluid is caused to exert an increasing upstream thrust against the rotor as the rotor shifts downstream to narrow the space between the rotor and the downstream portion of the rotor mount.

7. A flowmeter as set forth in claim 1 in which the rotor mount portions have marginal flanges directed toward the rotor for narrowing the exit openings from said spaces as compared with the width of the spaces in the regions surrounded by the flanges.

8. The flowmeter according to claim 1 in which the vanes called for are substantially coterminous with the upstream and downstream ends of the rotor body.

9. The flowmeter according to claim 1 in which the bearing means consists of trunnions unitary with said body which are received in said upstream and said downstream portions of said rotor mount.

10. The flowmeter according to claim 1 in which the bearing means consists of a stationary shaft at least one end of which is secured in said conduit segment.

No references cited.

RICHARD C. QUEISSER, *Primary Examiner.*

ROBERT L. EVANS, *Examiner.*